United States Patent [19]

Nagai

[11] Patent Number: 4,715,342
[45] Date of Patent: Dec. 29, 1987

[54] SYSTEM FOR CONTROLLING THE IGNITION TIMING OF AN INTERNAL COMBUSTION ENGINE

[75] Inventor: Masaaki Nagai, Fuchu, Japan

[73] Assignee: Fuji Jukogyo Kabushiki Kaisha, Tokyo, Japan

[21] Appl. No.: 813,434

[22] Filed: Dec. 26, 1985

[30] Foreign Application Priority Data

Dec. 28, 1984 [JP] Japan .................. 59-280561

[51] Int. Cl.$^4$ .................................. F02P 5/04
[52] U.S. Cl. ...................... 123/425; 123/435
[58] Field of Search .................. 123/425, 435

[56] References Cited

U.S. PATENT DOCUMENTS

| | | | |
|---|---|---|---|
| 4,245,602 | 1/1981 | Omori | 123/425 |
| 4,351,281 | 9/1982 | Geiger | 123/425 |
| 4,510,910 | 4/1985 | Ninomiya | 123/425 |
| 4,558,674 | 12/1985 | Okado | 123/425 |

Primary Examiner—Ronald B. Cox
Attorney, Agent, or Firm—Martin A. Farber

[57] ABSTRACT

A first maximum ignition timing table storing a plurality of degrees of ignition timing each producing a maximum engine torque dependent on engine speed with low-octane gasoline without occurring the knock, and a second maximum ignition timing table storing a plurality of degrees of ignition timing each producing a maximum engine torque dependent on engine speed with high-octane gasoline without occurring the knock are provided. A first ignition timing and a second ignition timing are provided from the first and second maximum ignition timing tables in accordance with engine speed, and a correcting quantity having a value within the difference between the first and second ignition timings is obtained. An ignition timing is obtained by using the correcting quantity.

2 Claims, 6 Drawing Figures

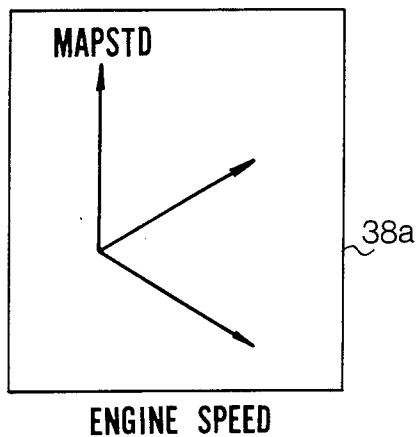
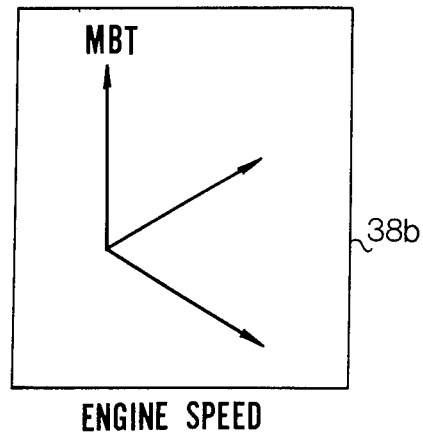
FIG. 2a    FIG. 2b
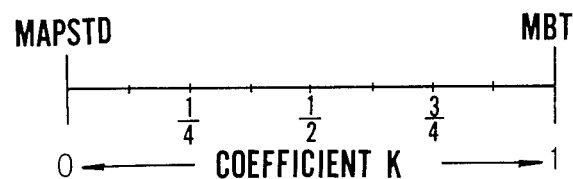
FIG. 3

SYSTEM FOR CONTROLLING THE IGNITION TIMING OF AN INTERNAL COMBUSTION ENGINE

BACKGROUND OF THE INVENTION

The present invention relates to a system for controlling the ignition timing of an internal combustion engine such as an automotive engine.

A learning control system for correcting the ignition timing has been proposed. The control system is adapted to advance the ignition timing so as to produce a maximum torque as long as the level of the engine knock does not exceed a tolerable level. The ignition timing is stored in a RAM and corrected in accordance with engine operating conditions. If the ignition timing is largely corrected in transient state, it takes a long time to converge the deviated ignition timing to a desired timing in steady state, or large variation occurs in engine torque, which will cause the decrease of driveability of a motor vehicle. Further, if the gasoline for the engine is changed to another kind of gasoline having different octane value, the ignition timing must be properly corrected.

SUMMARY OF THE INVENTION

The object of the present invention is to provide a system which may correct the ignition timing in accordance with engine operating conditions without deteriorating the performance of the engine, and may quickly converge deviated ignition timing to a desired timing.

According to the present invention, there is provided a system for controlling the ignition timing of an internal combustion engine having a microprocessor and an ignition timing control device comprising, sensing means for sensing the engine speed of the engine, a knock sensor for sensing engine knock and for producing a knock signal.

The system comprises a first maximum ignition timing table storing a plurality of degrees of ignition timing each producing a maximum engine torque dependent on engine speed with low-octane gasoline without occurring the knock, a second maximum ignition timing table storing a plurality of degree of ignition timing each producing a maximum engine torque dependent on engine speed with high-octane gasoline without occurring the knock, first means for obtaining a first ignition timing from the first maximum ignition timing table in accordance with engine speed, second means for obtaining a second ignition timing from the second maximum ignition timing table in accordance with engine speed, third means for obtaining a correcting quantity having a value within the difference between the first and second ignition timings, fourth means responsive to the knock signal for producing an ignition timing by using the correcting quantity.

In an aspect of the invention, the third means comprises multiplying a coefficient and the difference to obtain the correcting quantity, and the fourth means comprises adding the correcting quantity to the first ignition timing.

The other objects and features of this invention will be apparently understood from the following description with reference to the accompanying drawings.

BRIEF DESCRIPTION OF DRAWINGS

FIGS. 2a and 2b show tables storing a plurality of ignition timings;

FIG. 3 shows a range of a coefficient K;

DETAILED DESCRIPTION OF THE PREFERRED EMBODIMENT

Figure 1:
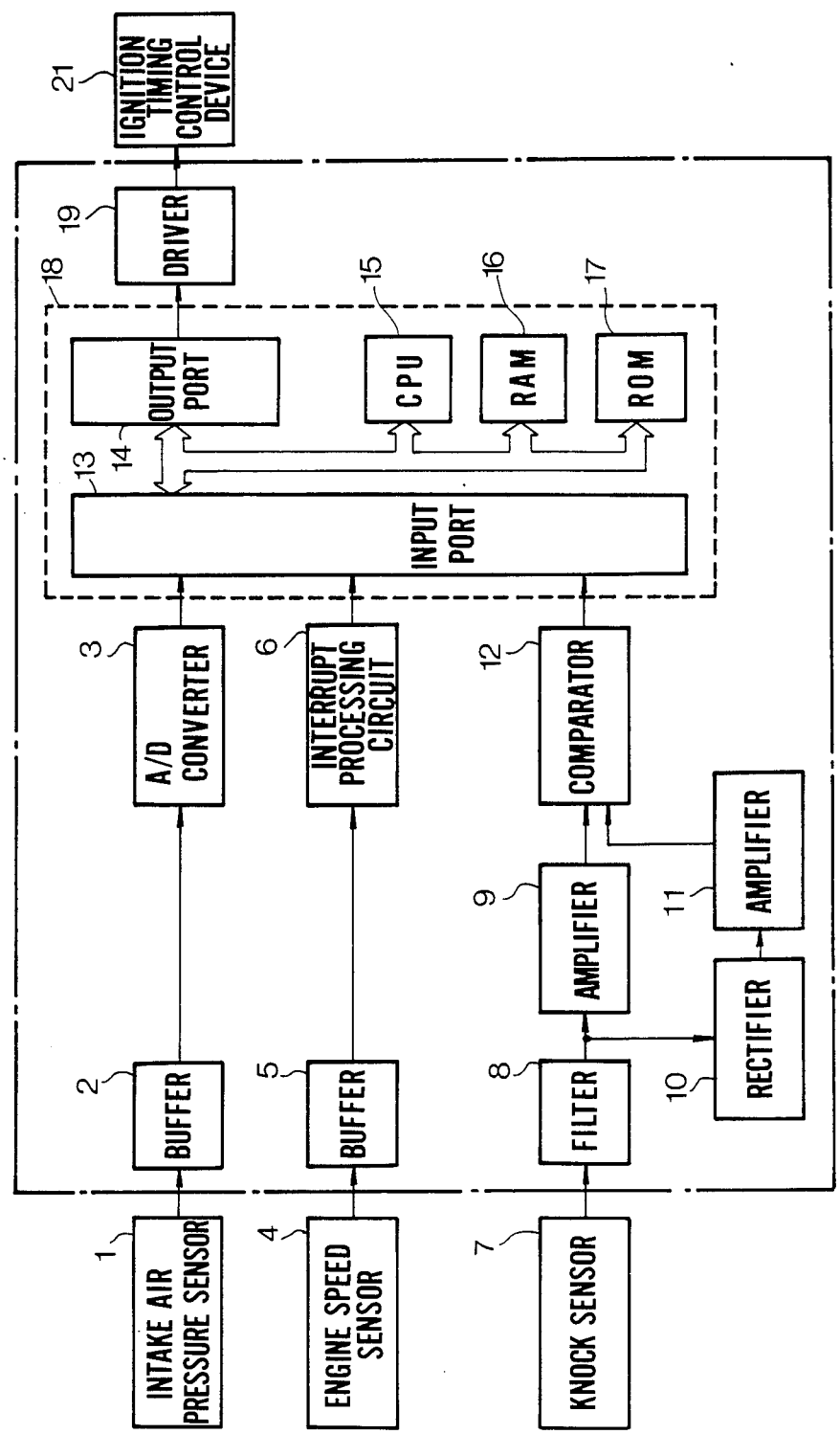
FIG. 1 is a block diagram showing a control system according to the present invention.

Referring to FIG. 1, an intake air pressure (or quantity) sensor 1, engine speed sensor 4 such as a crankangle sensor, and knock sensor 7 are provided to detect engine operating conditions. The output of the sensor 1 is applied to an A/D converter 3 through a buffer 2, and the output of the sensor 4 is applied to an interrupt processing circuit 6 through a buffer 5. The output of the knock sensor 7 is applied to a comparator 12 through a filter 8 and amplifier 9, and, on the other hand, to the comparator 12 through a rectifier 10 and amplifier 11. The comparator 12 compares both inputs and produces an output signal when an engine knock having a higher level than a predetermined value generates. Outputs of the A/D converter 3, circuit 6 and comparator 12 are applied to a microprocessor 18 through an input port 13.

The microprocessor 18 comprises a CPU 15, RAM 16, ROM 17 and output port 14. The output of the microprocessor 18 is applied to an ignition timing control device 21 through a driver 19 so as to control the ignition timing in accordance with the engine operating conditions sensed by the sensors 1, 4 and 7.

Figure 4:
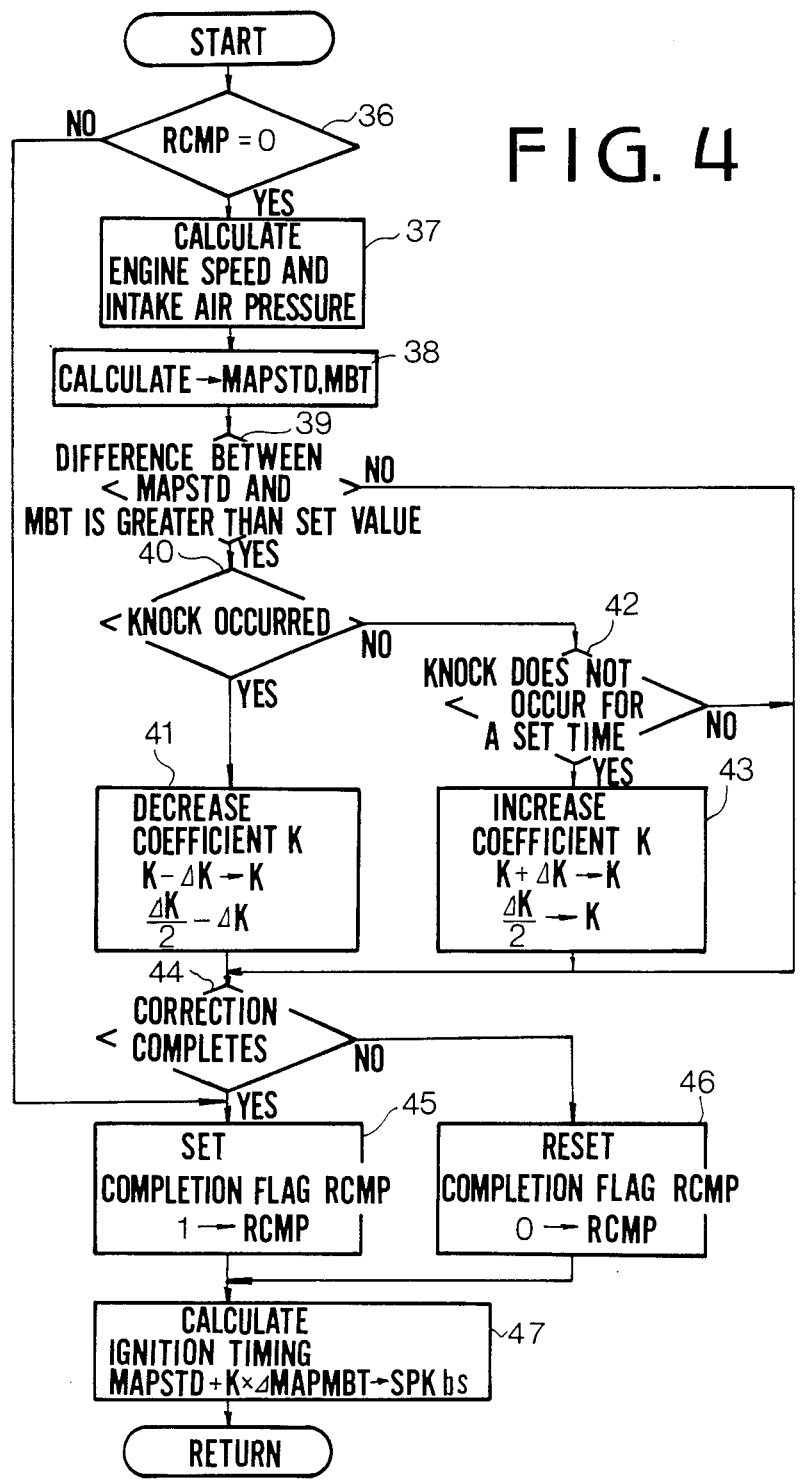
FIG. 4 is a flow chart showing the operation of the system.

FIG. 4 shows the operation of the system. At a step 36, it is decided whether correcting operation has been completed (whether a correction completion flag RCMP is set). Then, at a step 37, engine speed and intake air pressure are calculated based on output signals of sensors 1 and 4. Thereafter, at a step 38, a first maximum ignition timing MAPSTD and a second maximum ignition timing MBT are read from tables 38a and 38b (FIGS. 2a, 2b) in the ROM 17, in accordance with the engine speed and intake air pressure. The first maximum ignition timing is maximum timing for producing maximum torque with low-octane gasoline without occurring the knock and the second maximum ignition timing is maximum timing for producing maximum torque with high-octane gasoline without occurring the knock.

In the system, a coefficient K for correcting the ignition timing is provided. The value of the coefficient K is preliminarily set to a value between zero and 1 as shown in FIG. 3.

The coefficient K is stored in the RAM 16 and updated in accordance with engine operating conditions so as to converge the ignition timing to a desired ignition timing. The updating is performed under a predetermined condition and the condition is determined at a step 39. When the difference between the first and second maximum ignition timings read from the tables 38a and 38b is larger than a predetermined degree, for example 5°, the updating is performed. Namely, the program proceeds to a step 40, where it is determined whether a knock has occurred during the program. When the occurrence of knock is determined, the program proceeds to a step 41, and if not, proceeds to a step 42. At step 41, the coefficient K is decremented by a correcting quantity $\Delta K(\Delta K=K/2)$, and the remainder $K-\Delta K$ is stored in the RAM 16 as a new coefficient for the next updating. Accordingly, the correcting quantity $\Delta K$ at the next updating is $(K-\Delta K)/2$. Namely, the correcting quantity is a half of the coefficient K at updating. More particularly, if the initial coefficient is ½, the correcting quantity is ¼, and if it is 0 or 1, the correcting quantity is ⅛ as seen from FIG. 3.

At the step 42, it is determined whether the engine has operated without occurring knock for a predetermined period. When knocking does not occur for the period, the coefficient K is incremented by the correcting quantity $\Delta K$ at a step 43.

After the updating of the coefficient K at step 41 or 43, it is determined whether the correction is completed at a step 44. As will be understood from the above description, the correcting quantity $\Delta K$ decreases as the number of the correction increases. In the system, when the correcting quantity reaches a predetermined small value, the correction is completed. Accordingly, if quantity $\Delta K$ reaches the predetermined value, a correction completion flag RCMP is set at a step 45, or if not, the flag is reset at a step 46. At a step 47, ignition timing $SPK_{bs}$ is calculated by a following formula $$SPK_{bs}=MAPSTD+K\times \Delta MAPMBT \qquad (1)$$

where $\Delta MAPMBT=MBT-MAPSTD$

The ignition timing is stored in the RAM 16 and applied to the engine to operate at the ignition timing. The coefficient K is stored in the RAM 16. If the correction is not completed, the coefficient K is updated at the next program so as to converge the ignition timing to a desired ignition timing. It will be understood that if the initial coefficient K is 0, the ignition timing $SPK_{bs}$ calculated by the formula (1) is the maximum ignition timing MAPSTD at the first program. The ignition timing $SPK_{bs}$ obtained by the correction may be further corrected by fine correcting operation.

Figure 5:
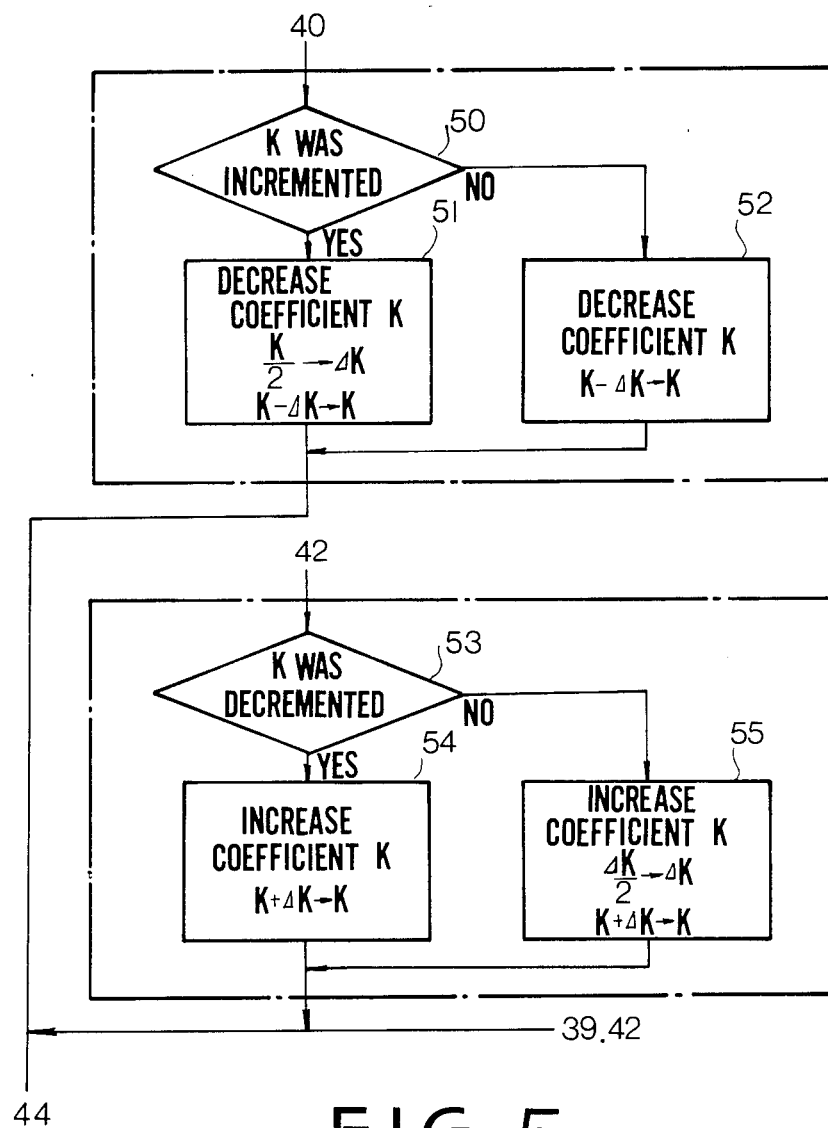
FIG. 5 is a flow chart showing another embodiment of the present invention.

FIG. 5 shows another embodiment of the present invention. In the system, the program proceeds from step 40 to a step 50, where it is determined whether the coefficient K has been incremented at the last program (knock did not occur). If the coefficient is incremented, the coefficient $\Delta K$ at the last program is halved and K is decremented by the new $\Delta K$ ($\Delta K/2$) at a step 51. If the coefficient has not been incremented, the coefficient K is incremented by $\Delta K$ without halving the $\Delta K$. On the other hand, at a step 53, it is determined whether the coefficient has been decremented in the last program. If it is decremented, the coefficient is incremented by the new $\Delta K$ ($\Delta K/2$), and if not so, the coefficient is incremented by $\Delta K$. Namely, as long as knocking continues, the coefficient k is decremented by $\Delta K$, and as long as knocking does not occur, the coefficient K is incremented by $\Delta K$. Accordingly, exact determination of knocking can be made.

In accordance with the present invention, coefficient K for determining a maximum advance is provided below the maximum timing for producing maximum torque with high-octane gasoline without occurring engine knock, and the coefficient is gradually updated. Accordingly, the ignition timing can be properly and quickly converged to a desired timing.

While the presently referred embodiment of the present invention has been shown and described, it is to be understood that this disclosure is for the purpose of illustration and that various changes and modifications may be made without departing from the scope of the invention as set forth in the appended claim.

What is claimed is:

1. A system for controlling ignition timing of an internal combustion engine having a microprocessor and an ignition timing control device comprising:

sensing means for sensing engine speed of the engine;

a knock sensor for sensing engine knock and for producing a knock signal;

a first maximum ignition timing table storing a plurality of degrees of ignition timing each producing a maximum engine torque dependent on engine speed with low-octane gasoline without the knock occurring;

a second maximum ignition timing table storing a plurality of degrees of ignition timing each producing a maximum engine torque dependent on engine speed with high-octane gasoline without the knock occurring;

first means for obtaining a first ignition timing from the first maximum ignition timing table in accordance with the engine speed;

second means for obtaining a second ignition timing from the second maximum ignition timing table in accordance with the engine speed;

third means for obtaining a coefficient having a value between zero and one, fourth means responsive to the knock signal for correcting the coefficient by a correcting quantity in a direction to prevent the engine knock;

fifth means for producing a corrected ignition timing based on either of said first ignition timing or said second ignition timing and an additional quantity dependent on the corrected coefficient; and sixth means for storing the corrected ignition timing for operation of the engine;

the additional quantity comprises multiplying the corrected coefficient and the different between the first and second ignition timings.

2. The system according to claim 1, wherein the corrected ignition timing is obtained by adding the additional quantity to the first ignition timing.

* * * * *